US008611962B2

(12) United States Patent
Andrews et al.

(10) Patent No.: US 8,611,962 B2
(45) Date of Patent: Dec. 17, 2013

(54) ACTIVITY ILLUMINATION

(75) Inventors: Anton Oguzhan Alford Andrews, Seattle, WA (US); David Walter Proctor, Bellevue, WA (US); Jeffrey Cheng-yao Fong, Seattle, WA (US); Thamer A. Abanami, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 11/771,585

(22) Filed: Jun. 29, 2007

(65) Prior Publication Data

US 2009/0004973 A1    Jan. 1, 2009

(51) Int. Cl.
 *H04B 1/38* (2006.01)
 *H04B 7/00* (2006.01)

(52) U.S. Cl.
 USPC .......................................... 455/566; 455/509

(58) Field of Classification Search
 USPC ...................... 455/66.1, 566, 414.2
 See application file for complete search history.

(56) References Cited

U.S. PATENT DOCUMENTS

| | | | |
|---|---|---|---|
| 6,372,974 B1 * | 4/2002 | Gross et al. | 84/609 |
| 6,606,506 B1 | 8/2003 | Jones | |
| 6,765,496 B2 | 7/2004 | Dayan | |
| 7,078,609 B2 | 7/2006 | Georges et al. | |
| 7,149,891 B2 | 12/2006 | Bruner et al. | |
| 2004/0131255 A1 | 7/2004 | Ben-Yaacov et al. | |
| 2004/0224638 A1 * | 11/2004 | Fadell et al. | 455/66.1 |
| 2004/0267390 A1 | 12/2004 | Ben-Yaacov et al. | |
| 2005/0114497 A1 | 5/2005 | Mani et al. | |
| 2005/0126374 A1 | 6/2005 | Ludwig | |
| 2005/0181756 A1 | 8/2005 | Lin | |
| 2006/0094406 A1 * | 5/2006 | Cortegiano | 455/414.1 |
| 2007/0288715 A1 * | 12/2007 | Boswell et al. | 711/164 |

FOREIGN PATENT DOCUMENTS

| | | | | |
|---|---|---|---|---|
| EP | 1 083 764 | * | 3/2001 | H04Q 7/32 |
| EP | 1083764 A2 | | 3/2001 | |
| KR | 1020030086676 | | 11/2003 | |
| KR | 1020060078885 | | 7/2006 | |

OTHER PUBLICATIONS

Written Opinion for PCT/US2008/067952 mailed Sep. 30, 2008.
International Search Report for PCT/US2008/067952 mailed Sep. 30, 2008.
"Netgear MP101 Wireless Digital Music Player," http://www.overclockers.co.uk/showproduct.php?prodid=NW-050-NG.
"Ace DVD iPod Video Converter 7.5.6.431," QArchive.org, 2006, http://ace-dvd-ipod-video-converter.ace-media.qarchive.org/.
"Digital Music Player," Escient 2005, http://www.escient.com/literature/MP150SellSheet.pdf.
"Digital Music Player LDP-200," Jun. 2005, http://lexar.com/newsroom/050608_Data%20Sheet_LDP200.pdf.

* cited by examiner

*Primary Examiner* — Michael Faragalla
(74) *Attorney, Agent, or Firm* — Alleman Hall McCoy Russell & Tuttle LLP

(57) ABSTRACT

A method to indicate that a first device is in communication with a second device is disclosed. The first device may receive an indication activity from the second device. The indication activity may change the display and the illumination object on the first device and the displays on the illumination object and the display are similar.

20 Claims, 4 Drawing Sheets

ACTIVITY ILLUMINATION

BACKGROUND

This Background is intended to provide the basic context of this patent application and it is not intended to describe a specific problem to be solved.

Indications that a device is in use are common. As devices have more capabilities, attempts have been made to indicate the particular capabilities that are currently active on the device. For example, a cell phone may be able to make calls and keep an electronic calendar, and icons on the display of the cell phone may indicate which application on the cell phone is active. In addition, lights or illumination objects have been added to devices such that users can tell with a quick glance whether devices are on or off.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method to indicate that a first device is in communication with a second device is disclosed. The first device may receive an indication activity from the second device. The indication activity may change the display and the illumination object on the first device. In another embodiment, the communication from the second device may be recognized by the first device and an indication activity may occur based on the type of communication received. In one embodiment, a user is presented options on what illumination action to take and in another embodiment, a user of the first device may create an illumination action when a particular type of communication is received.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
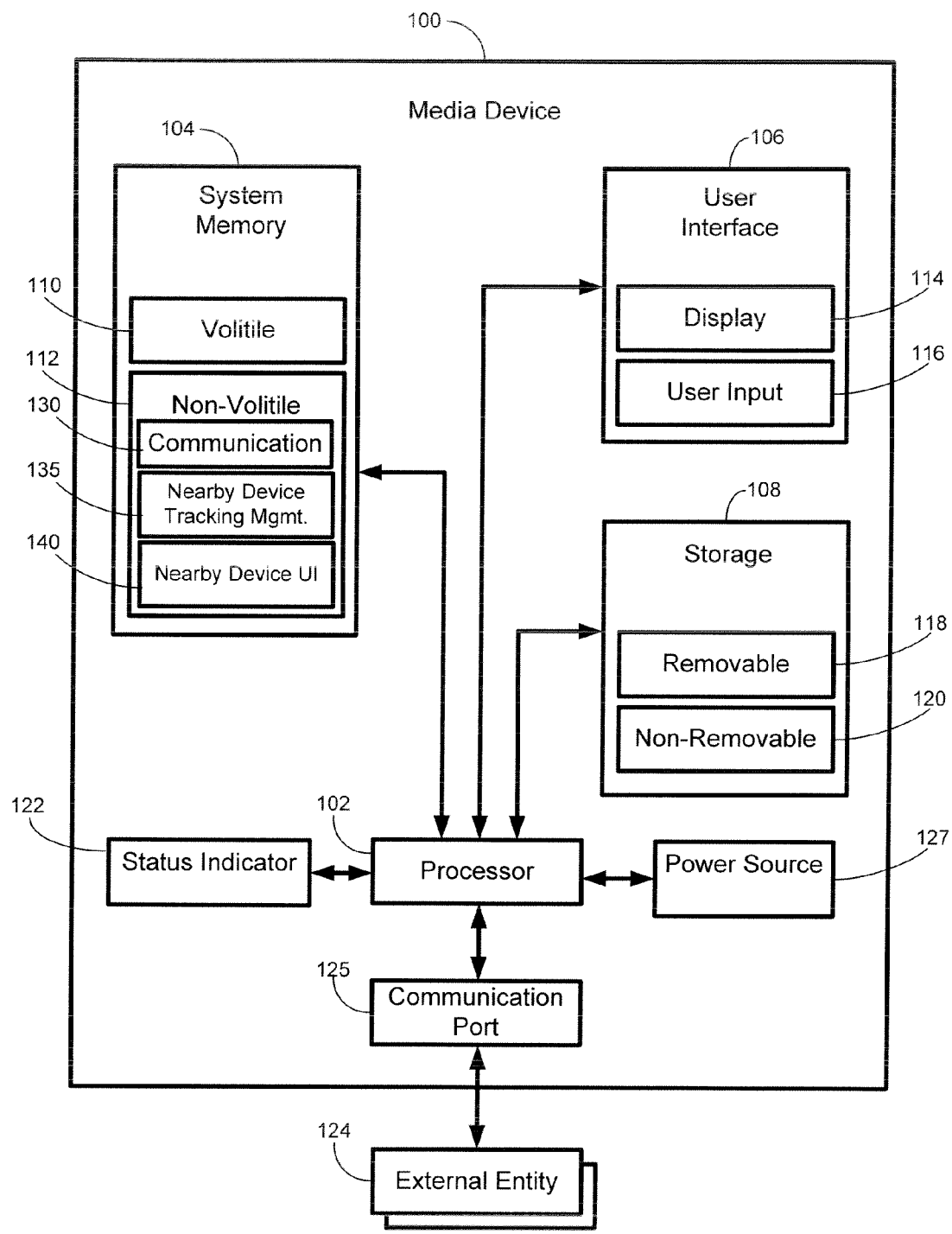
FIG. 1 is a block diagram of a computing system that may operate in accordance with the claims.

FIG. 1 is an illustration of exemplary hardware that may be used for a media device 100 that may track and organize other nearby media devices. The media device 100 may have a processing unit 102, a memory 104, a user interface 106, a storage device 108 and a power source (not shown). The memory 104 may include volatile memory 110 (such as RAM), non-volatile memory 112 (such as ROM, flash memory, etc.) or some combination of the two.

The media device 100 may also include additional storage 108 (removable and/or non-removable) including, but not limited to, magnetic or optical disks or tape or any other memory that can be easily rewritten, may keep data for long periods of time when power is removed, and may allow quick and efficient access to data. Such additional storage is illustrated in FIG. 1 by removable storage 118 and non-removable storage 120. Computer storage media includes volatile and nonvolatile, removable and non-removable media implemented in any method or technology for storage of information such as computer readable instructions, data structures, program modules, digital media, or other data. Memory 104, removable storage 118, and non-removable storage 120 are all examples of computer storage media. Computer storage media includes, but is not limited to, RAM, ROM, EEPROM, flash memory or other memory technology. Any such computer storage media may be part of device 100.

The processing unit 102 may be any processing unit 102 capable of executing computer code to decode media data from a compressed format into a useable form fast enough such that music and video may be played continuously without skips or jumps. When in a portable media device, it may also be useful if the processor 102 efficiently uses power to increase the life of the power source. The processing unit 102 may also be used to execute code to support a user interface and external communications.

The user interface may include one or more displays 114 for both displaying control information and displaying viewable media. The display 114 may be a color LCD screen that fits inside the device 100. User input(s) 116 may include manual buttons, soft buttons, or a combination of both. In addition, the user input may be gesture driven which may use no buttons or may be voice activated. Soft buttons may be used when the display 114 includes a touch screen capability. Manual buttons may include re-definable keys with programmable legends.

A status indicator 122 may be an illumination object that is coupled to the processor. The status indicator may be an LED or other light. The LED may be able to change colors and may be able to be turned on and off quickly. There also may be a plurality of status indicators. Of course, other status indicators are possible.

The media device 100 may also contain communications port or connection(s) 125 that allow the device 100 to communicate with external entities 124, such as network endpoints, other media devices, network access points, or a computer used for synchronization. Communications connection(s) 125 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The power source 127 may be a battery that may be rechargeable, and other power sources are possible.

A variety of functions, implemented in logic or software, may be used to support tracking and organizing nearby media devices 100, 124. Such functions may include a communication module 130, a nearby device tracking management module 135, and a nearby device tracking user interface 140 that may facilitate user interaction related to tracking, authenticating and organizing nearby devices.

In operation, a user may connect to external entities 124 through a variety of network types to include local and wide area networks using any number of communication protocols and standards. For example, a media device may connect to a network implementing any of the Ethernet, ARCNet, FDDI, IEEE 1394, Token Ring, USB, Web Services, MTP or TCP/IP standards and protocols. Media devices may connect to each other through a central access point or in an ad hoc fashion. Once connected, the devices may share and transfer data files including media content. A user may receive a media object, including, for example, music or video content, text or audio-based books, electronic games, photos, audio message, video messages or virtually any computer-based file or collection of files, over the communication port 125. In one embodiment, the media object may be sent over an ad-hoc wireless network from an external device 124. To illustrate, the media object may have been purchased for use on the external device 124 and the user of the external device 124 may be entitled to full and unlimited access to that media object using that device. The user of the external device 124 may wish to share the media object with a user of the media device 100 and may forward the media object to the media device 100.

Figure 2:
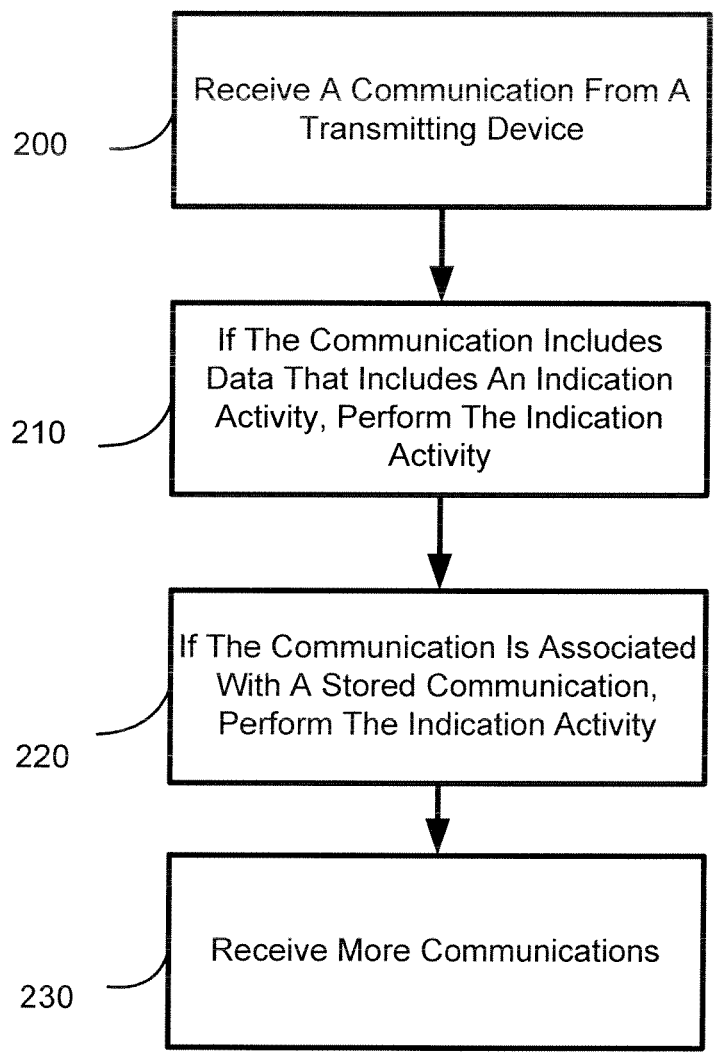
FIG. 2 is a flowchart of a method of illuminating a device based on communications received.

FIG. 2 is an illustration of a method of indicating activity on a portable media device. The portable media device may be any device such as device 100. Currently, some devices indicate the status of the device with a visual indication, such as a flashing light. In most cases, the visual indication relates to the status of the device and is not related to what other devices are doing. The present method and apparatus attempts to use visual indications to represent what others devices are doing and allow the user of the receiving device 100 to feel as part of the experience with the sending device 124 and the user of the other device 124.

At block 200, a communication may be received from a transmitting device such as the external device 124. The communication may take a variety of forms. One example may be a simple announcement communication. In another example, the communication may be an announcement communication with more data such as what the sending player is doing right now. In yet a further example, the communication includes an announcement, data regarding what the player is doing and data that indicates how the sender wishes the communication to be indicated on the receiving device 100. Of course, other forms of communication are possible.

Figure 3:
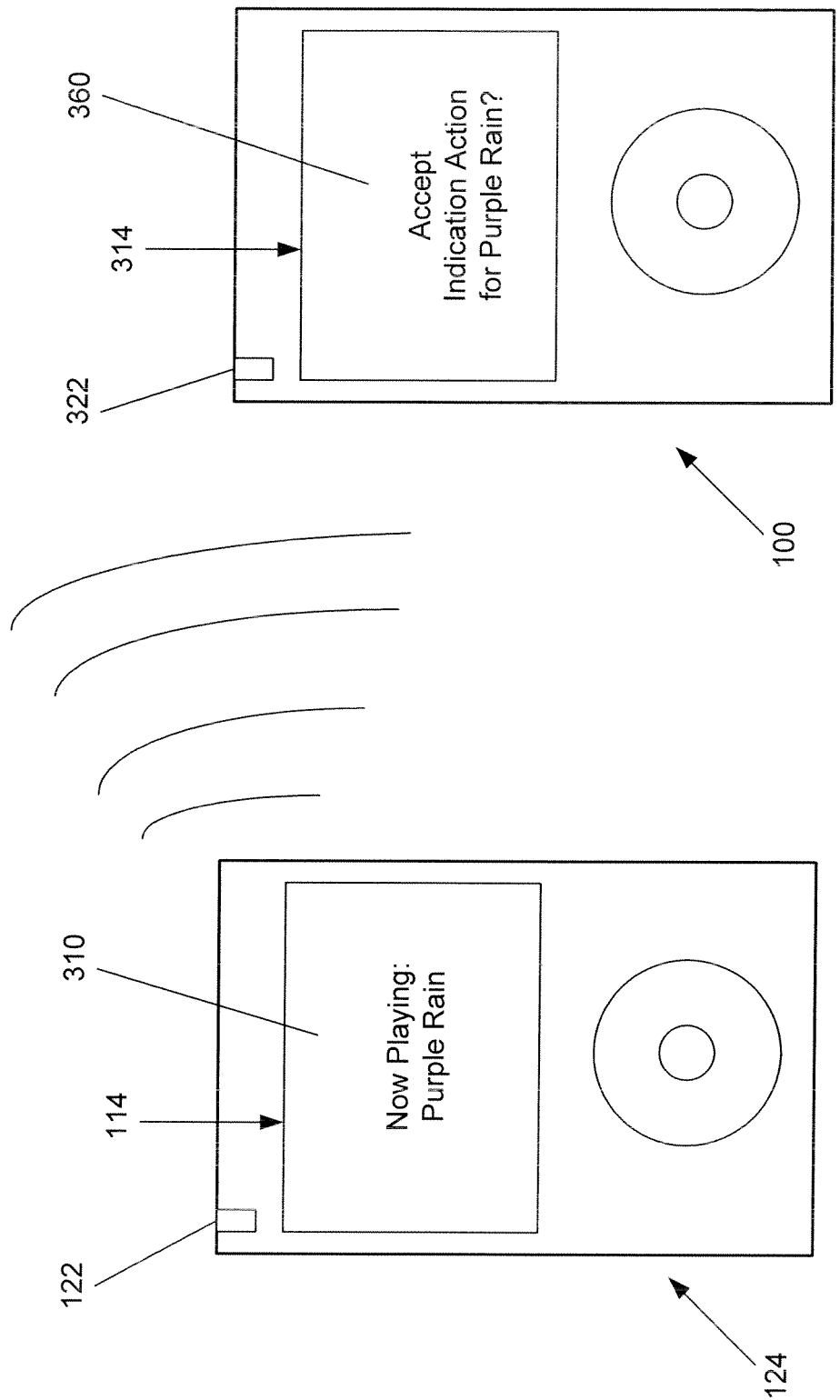
FIG. 3 is an illustration of a first device communicating a indication action to a second device.
Figure 4:
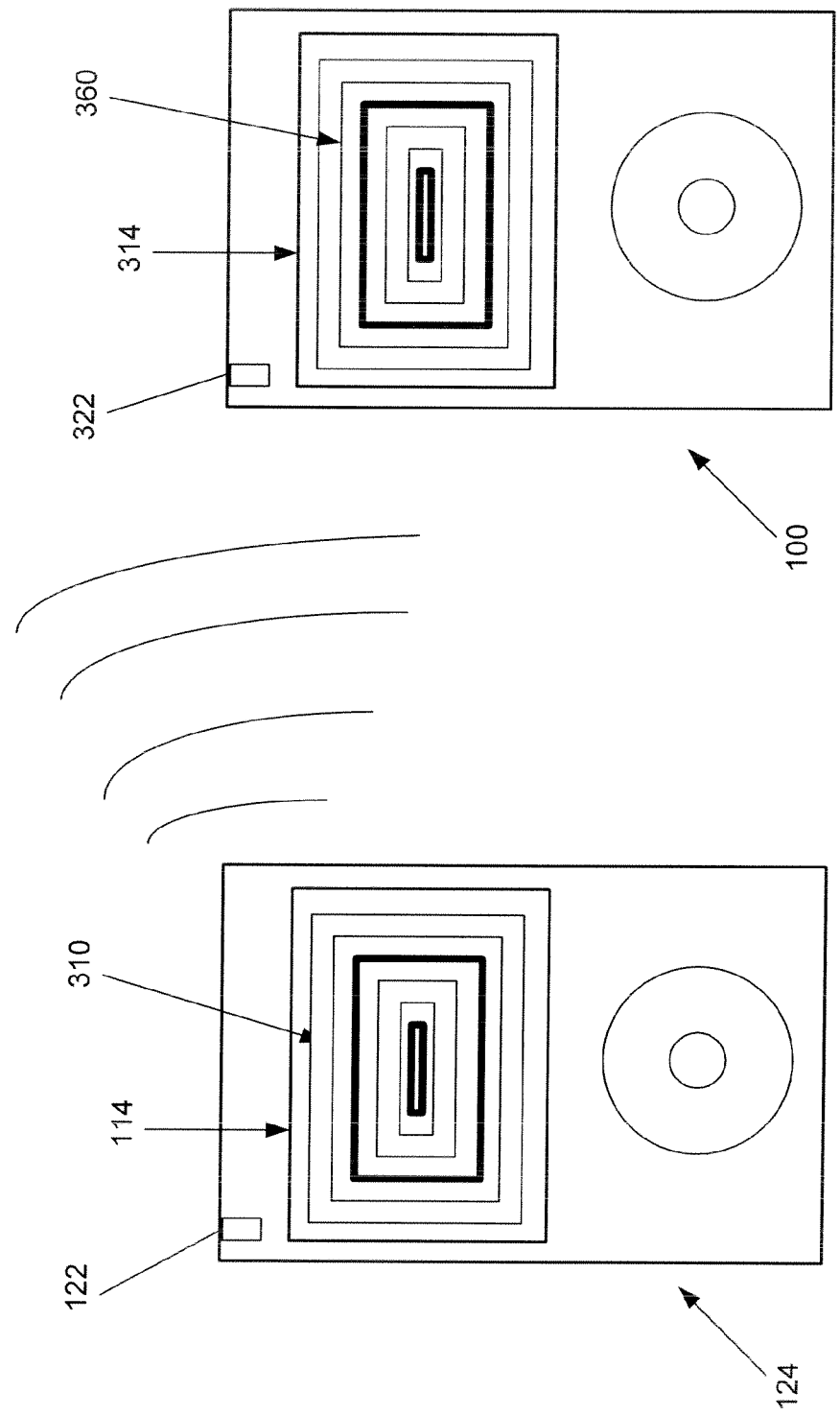
FIG. 4 is an illustration of a first device and a second device displaying a similar display as an indication action.

At block 210, if the communication includes data that includes an indication activity, the indication activity may be performed. As the indication activities may be created and are not limited to certain actions, the potential for indication activities is virtually limitless. FIGS. 3 and 4 illustrate an external device 124 communicating to a device 100.

In one embodiment, the indication activity is a visual indication such as illuminating the illumination object 322 on the receiving device. The illumination object 322 may be changed from a first state to a second state. For example, a LED on the receiving device 100 may be the illumination object 322 and may change from a state where it is not illuminated to a state where it is illuminated. In another example, the illumination object 322 may flash. In yet another example, the illumination object 322 may change from a first color to a second color. In another example, there may be a plurality of illumination objects 322 and the indication activity may involve all the illumination objects 322.

The illumination object 122 322 may be varied in a variety of ways. The brightness of the illumination object 122 322 may be varied. For example and not limitation, a leader in a game may have a brighter illumination object 122 322 and the further ahead a player is, the brighter the illumination. Similarly, if a player is behind, the illumination object 122 322 may become dimmer. Many variations are possible such as when a player is catching up, the illumination may be brighter. Similarly, download progress may be indicated by the brightness of the illumination object 122 322. For example, when the download begins, the illumination may be low and when the download is nearly complete, the illumination may be bright. A similar illumination pattern may occur on the sending device. As yet another example, when searching for other devices, the level of illumination may indicate the number of devices found. For example, if many devices are found then the illumination may be brighter than if fewer devices are found.

The color of the illumination object 122 322 may also be varied. For example, a connection for technical reasons such as a patch download or a synchronization process may have a particular color where a connection for social purposes may have another color. Similarly, a connection with a friend on a friend list may have a first color and a connection with someone previously unknown or anonymous may be a second color.

The rhythm of the illumination object 122 322 may be varied. A steady download of data may be indicated by a steady pulse of the illumination object 122 322 where a completed download may be indicated by a burst of illumination. The synchronization of devices, whether through wireless or wired means, may be indicated by the illumination object 122 322. The two devices may use timing packets to ensure that the illumination object 122 322 on each device (sending and receiving) blinks at the same time, at opposite times, in synchronization or in any other timed pattern of interest. Of course, all the examples of varying the illumination object 122 322 are just examples and are not meant as limitations. Many embodiments and variations of varying the illumination object 122 322 are possible and are contemplated.

In another embodiment, the indication activity may entail synchronizing the display 114 with the illumination object 122 322. For example, a display may be created on the display 114 that is related to the state of the illumination object 122 such as the illumination object 122 being a first color and the display 114 displaying a similar color. In another embodiment, the illumination object 112 is a first color and the display 114 perimeter is a similar color. In yet another embodiment, the display 114 on the sending device 124 may display a color that may flow out the device 124 and then out the illumination object 122. The reverse may be displayed in the receiving device 100, where the illumination object 322 may "bleed" onto a LCD receiving display 314. In one embodiment, a red ball will be illustrated as flying from the end of the display 114 opposite the illumination device 122 toward the illumination device 122. As the red ball leaves the display 114, the illumination device 122 may glow red. At the receiving device 100, when the data is received, the illumination device 322 may glow red and then turn off as the ball is displayed traveling down the receiving display 314 (away from the illumination device 322) of the receiving device 100. Of course, balls of the same color or different color may follow.

In a more complex example, a white rocket may be displayed on the display 114 of the sending device 124. The rocket may take off and leave a red flame. The white color of the rocket may flow off the display 114 of the sending device 124 and be displayed on the illumination device 122. The color red then may be indicated on the display 114 of the sending device 124 as the rocket flames move up off the display 114 and then off the illumination device 122. The receiving device 100 may display the color white in the illumination device 322 as the rocket reaches the receiving device 100. The white rocket then may reach the display 314 of the receiving device 100 and red may be displayed in the illumination device 322. As the rocket flows into the receiving device 100, the flame from the rocket may flow from the illumination device 322 to the display 314.

Related, a message 360 related to the received communication may be displayed on the display 314 on the receiving device 100. The variations are almost limitless. FIG. 4 illustrates that an interesting pattern 310 on the display 114 on the external device 124 is the same as the interesting pattern 360 on the display 314 on the receiving device 100.

In execution, the indication activity 360 may be stored in a file or a series of files. The format of the file may be any appropriate file type such as an XML file. In another embodiment, the indication activity 360 may be an object that is used by other applications to create the visual indication. As the indication activity 360 may be stored as a file, the indication activity file may be communicated in a variety of manners, such as downloading the file, communicating the file from one device to another, etc.

The indication activity 360 may also be created by a user. A separate application may be used to create the indication activity. In one example, the application provides a user a drop down list of the capabilities of the device 100 and the user can select the capability to be executed, for the period of time, etc. In addition, the user may be able to edit the capabilities. For example, a capability may be to display a text box. A user may be able to add specific text to the text box. Similarly, the display 114 may be able to be control to the display to the point that individual pixels may be turned on and off, made to display a desired colors, etc.

In another embodiment, the user of the device 100 may be presented the option whether to perform the indication activity such as in FIG. 3. For example, a text box may be displayed on the device 100 where the user can select whether to perform the indication activity 360. In yet another embodiment, a user may set up default values such as "never perform received illumination activities", "perform illumination activities from known senders," or "perform all received illumination activities." Of course, many variations are possible.

At block 220, if the communication is associated with a stored communication in a memory, the indication activity 360 may be performed. For example, there may be a standard indication activity 360 when a device receives a notification that a device within communication range is streaming music and there may be a standard indication activity 360 when a device within communication range is seeking to receive music from another device. As an example and not limitation, an inquiry from another user may not include an illumination activity but the inquiry may match a stored communication in the memory (an inquiry) and the related indication activity 360 (blink illumination object 122) may be performed.

A user may be able to configure the device 100 to perform an indication activity 360 when a particular type of indication activity 360 is received. For example, a user may desire not to be bothered and any communication received may only make the illumination device 122 blink. In another embodiment, the user may be actively seeking to hear music streaming from other devices, so the device 100 may be programmed to illuminate the illumination object 122 and the display 114 in an exciting manner such as in FIG. 4.

At block 230, if the communication is not associated with a stored communication in the memory, the steps may be repeated. In other words, the device 100 may continue to receive communications and review the communications to see whether the communication has an indication object or matches an already stored communication. In one embodiment, a message is displayed on the device 100 that the communication was received. The device 100 may present an option to store the communication type and associate an indication activity 360 with the stored communication type.

In use, the indication activity 360 possibilities are limited only by the imagination. In one embodiment, an external entity 124 communicates to the device 100 that is it currently "dj"ing or communicating music for other users to receive. In addition, the user of the external entity 124 has already indicated that it will accept all communicated indication activities 360. Accordingly, the device 100 may illuminate its illumination object 122 a shade of purple and the display 114 may display a similar shade of purple. This shade of purple may also be displayed on the external entity 124 such that the same purple color will be displayed on both the sending external entity 124 and the receiving device 100. In another embodiment, the purple may fade and brighten in synchronization to the music or other media being communicated on both the external entity 124 and the device 100. In this way, both the user of the external device 124 and the user of the device 100 may feel in synch as both of the devices 124 and 100 fade and brighten in synch to the music. Others may view the displays on the devices 124 and 100 and may be drawn into joining the communication session.

Another possibility is to communicate album art associated with the music being communicated. The album art may be modified by a user of an external device 124 and may be caused to spin on the display 114 of the device 100. Related, the illumination object 122 may turn a color that relates to the album art. Other objects may be communicated such as movies, animations, vibrations or any other sensory combination.

In another embodiment, the action being performed by the external entity 124 may control the indication activity 360. This indication activity 360 may be overridden by the sender using the external device 124 or by the receiver using the device 100. For example, a zunecaster may communicate that all the zunes subscribing to the current zunecast have the same illumination object 122 illumination characteristics.

Another aspect is that the illumination object 122 and display 114 may be related. In one example, the illumination object 122 glow may be extended onto the display 114. For example, if a file download is complete, the illumination object 122 may glow green. A halo from the illumination object 122 may be displayed on the display 114 is the same color as the illumination object 122. Similarly, the glow on the display 114 may have a similar brightness, color, rhythm and may be in synch with the illumination object 122. The glow may flow across all or part of the display 114. In one embodiment, the glow on the display 114 and the illumination object 122 are the same on the sending and receiving devices. If the sending device is a personal computer or a device without a illumination object 122, the display on the personal computer may match the display on the portable device 100.

The illumination object 122 and the display 114 also may be used to indicate the flow of data. As data may flow from a device 100, a blue symbol may flow from the bottom of the display 114 (away from the illumination object 122) toward the top of the display 114 and then the illumination object 122 may glow blue for a brief period of time. In this way, it will appear that the blue symbol has traveled out of the device 100 to another device 124. Similarly, the receiving device 100 may illuminate its illumination device 322 blue and then the illumination device 322 may fade to black and the display 314 may fade to blue, starting at the top (closest to the illumination object 322) toward the bottom of the display 100. Of course, the blue symbol could be any object and any color. In fact, the entire display could be a color and the display 114 may have a highlight that flows from the bottom of the display 114 toward the top and them the illumination object 122 may be illuminated in the same highlight color. The same process of using illumination to indicate a flow of data may also be used during a synchronization process, during a music cast, during a data cast, etc. The process may also be used when data is being received, during which the illumination object 122 may illuminate first and the display 114 may illuminate second in a progressive manner down the display 114 to indicate that the data is flowing into the player.

In a similar manner, switching between menus and applications of the device 100 may be indicated using the illumination object 122. For example, switch from a menu to a television application may have the menu shrink into a shape such as crumpled ball of paper and the crumpled ball may be illustrated in the display 114 as flowing toward the illumination object 122 at which point the illumination object 122 may illuminate to indicate that the menu has been removed. In a similar manner, when a synchronization process begins, the previous display may be illustrated as being "sucked" out of the device 100 and out the illumination object 122 while the new synchronization screen is displayed in its place. When accessories are added to the device 100, a similar process may occur where a previous display is "sucked out" of the device 100 out through the illumination object 122 and a new menu may be displayed. In one embodiment, being sucked out may entail distorting the display as being stretched and pulled toward the illumination object 122.

Similarly, the color of the illumination object 122 may be related to the content on the display 122. For example, the illumination object 122 may turn a color that relates to the album art. In another embodiment, the illumination object 122 may be related to messages that are displayed on the display 114. For example, if a message is flashing in the display 114, the illumination object 122 also may flash. The flashing may be synchronized and may be in the same color. In yet another embodiment, videos and games on the display 114 may use the illumination object 122 as part of the game.

In a game scenario, as previously described, the illumination object 122 may be used to indicate which player is in the lead, which player is behind, if a player is catching up, if a player is falling behind, if a player is close to the end of play, whether a player picked up bonus point, if the player has a current high score, etc. If a player wins, the illumination object 122 may perform a victory dance of exciting illumination. In this way, people standing around the player may be able to tell what is going on in the game simply by watching the illumination object 122. Similar to other aspects of the illumination object 122, a game designer can incorporate the illumination object 122 and display into the game design in virtually any manner. Of course, these are example and are not meant to be limiting.

In yet another aspect, the illumination object 122 may be used to remind a user that the device is on. For example, the illumination object 122 may periodically blink to remind the user that the device is on. As a result of the periodic illumination of the illumination object 122, a user will realize that a player has been inadvertently left on in a playing mode and that the power source 127 is being drained In yet another aspect, the illumination object 122 may be used for diagnostic purposes or to report an error. The illumination object 122 may be illuminated in such a manner not to offend a user but to encourage a user to try again. For example, a glowing red illumination object 122 usually means a failure of some sort. By changing the illumination to something friendlier, a better user experience may be possible. For example, the illumination object 122 may slowly flash yellow to indicate a problem with intermittent green flashes to indicate that the problem may be corrected by rebooting the player. At the same time, the display 114 may provide additional details (which may be in yellow) on the problem and how to fix the problem (which may be in green).

As a result of the illumination of the illumination object 122 and the display 114, users may be provided with feedback that they are part of a community. As the displays 114 on the various devices are related in a variety of ways, users can see that the devices are connected and as the devices are connected, the users as are connected. For example, at a concert, the illumination object 122 may be used to indicate whether a user on the friend list is nearby, whether a user is seeking new music, whether a user is winning in a game, whether the user wants to join a community of users, etc. The potential indications and combination with the display 114 is virtually limitless.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of indicating activity on a first portable media device during a communication between the first portable media device and a second portable media device that is separate from the first portable media device, the method comprising:
   on the first portable media device,
      receiving a communication from the second portable media device, wherein the communication includes a media object;
      if the communication includes an indication activity separate from the media object, the indication activity specifying a manner in which to display an indication of receipt of the communication by the first portable media device, then performing the indication activity;
      if the communication is associated with a stored communication in a memory, performing an indication activity wherein the indication activity is definable; and
      then presenting the media object after performing the indication activity.

2. The method of claim 1, wherein if the communication is not associated with a stored communication, displaying a message related to the communication and allowing the communication to be stored and associated with the indication activity.

3. The method of claim 1, wherein the first portable media device comprises a display and an illumination object comprising a light spaced from the display, and wherein the indication activity is a visual indication and the visual indication includes changing the light from a first state to a second state.

4. The method of claim 3, wherein the visual indication further comprises creating an illustration on the display on the first portable media device that is similar to the illumination object.

5. The method of claim 4, further comprising creating a display on the first portable media device that is related to the second state of the illumination object.

6. The method of claim 4, further comprising creating the illumination object and the display on the first portable media device to have similarities selected from a group comprising:
   brightness of the illumination object and the display;
   color of the illumination object and the display;
   rhythm of the display and the illumination object; and
   synchronization of the illumination object and the display.

7. The method of claim 4, wherein the illumination object is a first color and wherein a display perimeter on the first portable media device is a similar color and a message related to the received communication is displayed on the display on the first portable media device.

8. The method of claim 1, wherein the received communication indicates a type of indication activity to be executed.

9. The method of claim 3, further comprising illustrating an outflow of data by displaying a data object flowing on a sending display from a display end opposite the illumination object toward the illumination object and then illuminating the illumination object in a manner related to the data object and illustrating an inflow of data by illuminating the illumination object and then displaying a data object flowing on the display from a display end near the illumination object toward an end of the display on the portable media device away from the illumination object.

10. The method of claim 9, wherein the inflow of data is on a separate receiving device and the display of a received data object on a receiving illumination object and a receiving display is similar to the illustration of the display of sending the data object on the sending display and sending illumination object on a sending device.

11. The method of claim 1, wherein the indication activity is created by a user.

12. The method of claim 1, wherein the indication activity is downloadable.

13. The method of claim 1, wherein the indication activity is communicated from a first device to a second device wherein the second device executed the communicated indication activity.

14. A computer-readable storage device comprising computer executable instructions for indicating activity on a first portable media device during a communication between the first portable media device and a second portable media device, the computer executable instructions comprising instructions for:
   on the first portable media device,
      receiving a communication from the second portable media device, wherein the communication includes a media object;
   if the communication includes an indication activity separate from the media object, the indication activity specifying a manner in which to display an indication of receipt of the communication, then performing the indication activity, wherein the indication activity represents an activity occurring on the second portable media device and includes changing an illumination object on the first portable media device from a first state to a second state;
   if the communication is associated with a stored communication in a memory, performing an indication activity on the illumination object wherein the indication activity is definable;
   displaying similar displays on the illumination object and a display on the first portable media device; and
   then presenting the media object after performing the indication activity.

15. The computer-readable storage device of claim 14, wherein synchronizing the illumination object and the display on the first portable media device further comprises creating a display that is related to the state of the illumination object.

16. The computer-readable storage device of claim 15, wherein the illumination object and the display on the first portable media device have similarities selected from a group comprising:
   brightness of the illumination object and the display;
   color of the illumination object and the display;
   rhythm of the display and the illumination object; and
   synchronization of the illumination object and the display.

17. The computer-readable storage device of claim 15, further comprising illustrating an outflow of data by displaying a data object flowing from a display end opposite the illumination device toward an end near the illumination object and then, on a separate receiving device, illuminating the illumination object in a manner related to the data object and illustrating an inflow of data by illuminating the illumination object on the receiving device and then displaying a data object flowing from the end of the display near the illumination object toward the end of the display away from the illumination object.

18. The computer-readable storage device of claim 15, further comprising computer executable instructions for illuminating the illumination object to indicate a status of a process between two or more computing devices.

19. A computer system comprising a processor physically configured according to computer executable instructions for indicating activity on a first portable media device during a communication between the first portable media device and a second portable media device, a memory to assist the processor and an input/output circuit, the computer executable instructions comprising instructions for:

on the first portable media device,
receiving a communication from the second portable media device, wherein the communication includes a media object;
if the communication includes an indication activity separate from the media object, the indication activity specifying a manner in which to display an indication of receipt of the communication, then performing the indication activity, wherein the indication activity represents an activity occurring on the second portable media device and includes changing an illumination object on the first portable media device from a first state to a second state;
if the communication is associated with a stored communication in the memory, performing an indication activity on the illumination object, wherein the indication activity is definable;
illuminating the illumination object to indicate a status of a process between two or more computing devices;
displaying similar displays on the illumination object and a display on the first portable media device wherein the illumination object and the display have similarities selected from a group comprising:
brightness of the illumination object and the display;
color of the illumination object and the display;
rhythm of the display and the illumination object; and
synchronization of the illumination object and the display; and
presenting the media object after performing the indication activity.

20. The computer system of claim 19, further comprising computer executable instructions for illustrating an outflow of data by displaying a data object flowing from a bottom of the display to a top of the display and then, on a separate receiving device, illuminating the illumination object in a manner related to the data object and illustrating an inflow of data by illuminating the illumination object and then displaying a data object flowing from the top of the display to the bottom of the display.

* * * * *